United States Patent
Kuo (10) Patent No.: US 9,213,924 B1
(45) Date of Patent: *Dec. 15, 2015

(54) APPARATUS FOR PRINTING COLORED AND WHITE TONER

(71) Applicant: Eastman Kodak Company, Rochester, NY (US)

(72) Inventor: Chung-Hui Kuo, Fairport, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,183

(22) Filed: Oct. 21, 2014

(51) Int. Cl.
  *G03G 15/01* (2006.01)
  *G06K 15/14* (2006.01)
  *G06K 15/02* (2006.01)
  *G03G 15/00* (2006.01)

(52) U.S. Cl.
  CPC .............. *G06K 15/14* (2013.01); *G03G 15/01* (2013.01); *G03G 15/5062* (2013.01); *G03G 15/6585* (2013.01); *G06K 15/188* (2013.01)

(58) Field of Classification Search
  CPC ... G03G 15/01; G03G 15/08; G03G 15/5062; G03G 15/6585; G06K 15/14; G06K 15/188
  USPC ........ 399/39, 45, 223, 53, 54, 341; 430/120.1
  See application file for complete search history.

(56) References Cited

U.S. PATENT DOCUMENTS

| | | | |
|---|---|---|---|
| 6,608,641 | B1 | 8/2003 | Alexandrovich et al. |
| 2006/0133870 | A1 | 6/2006 | Ng et al. |
| 2007/0201062 | A1* | 8/2007 | Watanabe ............. 358/1.9 |
| 2009/0220695 | A1 | 9/2009 | Oynnagi et al. |
| 2011/0234660 | A1 | 9/2011 | Yoshida |
| 2013/0145383 | A1 | 6/2013 | Hao et al. |
| 2013/0278660 | A1* | 10/2013 | Tsuji ..................... 347/14 |
| 2014/0255053 | A1* | 9/2014 | Ohshika ................. 399/53 |

* cited by examiner

*Primary Examiner* — Sophia S Chen
(74) *Attorney, Agent, or Firm* — Peyton C. Watkins; Nelson A. Blish (57) ABSTRACT

An apparatus for printing on a receiver with a plurality of colored dry inks and a dry white ink, the apparatus includes a look-up table having a set of one dimensional look-up tables for each of the colored inks and black inks, which look-up table which receives a value corresponding to a laydown at each pixel location of the receiver; wherein the look-up table determines a laydown of white ink at each pixel location depending on the laydown of the colored inks and black ink; and a logic and control unit which determines an amount of white ink to laydown by computing a value from the determined white laydowns of each look-up table.

10 Claims, 5 Drawing Sheets

APPARATUS FOR PRINTING COLORED AND WHITE TONER

CROSS REFERENCE TO RELATED APPLICATIONS

Reference is made to commonly assigned U.S. patent application Ser. No. 14/519,174 filed Oct. 21, 2014 by Chung-Hui Kuo, entitled: "Method For Printing Colored And White Toner Using A Device Link Profile", and commonly assigned U.S. patent application Ser. No. 14/519,170 filed Oct. 21, 2014 by Chung-Hui Kuo, entitled: "Method For Printing Colored And White Toner Using A Look-Up Table"; the disclosures of which are incorporated herein.

FIELD OF THE INVENTION

The present invention generally relates to electrophotographic printers and, more particularly, to electrophotographic printers that deposit "dry" white ink (commonly referred to as white toner) in a controlled amount for cost efficiencies and image quality.

BACKGROUND OF THE INVENTION

Electrophotographic printers produce images by depositing toner on receivers (or "imaging substrates"), such as pieces or sheets of paper or other planar media, glass, fabric, metal, or other objects. Printers typically operate using subtractive color: a substantially reflective receiver is overcoated image-wise with cyan (C), magenta (M), yellow (Y), black (K), and other colorants. Other toner compositions can also be used to produce effects beyond simple image appearance.

In electrophotography, there is a need to deposit white toner in combination with colored toner for various purposes such as image quality and the like. The prior art discussed below deposits white ink and other color toner on the receiver.

For example, U.S. Patent Publication 2009/0220695 A1 discloses a method of creating a record medium using an inkjet process by which a non-white background can be completely hidden. This is achieved by printing a metallic ink first and then a white ink. Wherever there is an overlap between the two layers, an opaque layer is formed which completely hides the background color or transparency of the medium. A combination of metallic and white layers creates the opaque layer which is extremely white because of the scattering by the white layer and reflecting properties of the metallic layer.

U.S. Patent Publication 2011/0234660 A1 discloses a method of printing on a transparent medium by IJ process using color inks, metallic ink and white ink. The opaque areas are created by the process described in the '695 disclosure above. Use of white and metallic provides the cost advantage as well as be able to provide the desired luster effects. The image is viewed from the non-printed side for transparent substrate where the white layer is uniformly applied farthest from the medium. From opaque medium, white is applied first and then metallic and finally the color inks are jetted. The metallic layer serves as a specialty gloss layer to provide different effects and opacity.

U.S. Patent Publication 2013/0145383 A1 discloses an inkjet recording method which uses a white overlaying layer. The process is designed for remote proofing in which a longitudinal film is passed through two separate IJ stations. The substrate may contain an ink reception layer.

If the substrate is opaque, white is first laid down uniformly and after white layer is dried, color image is applied above it and dried again. On the other hand, when the substrate is transparent, color image is applied first and then dried. This is followed by the uniform application of white inkjet drops over the entire color image areas which are then dried again. In another variation, the white can be applied on the opposite surface in the case of a transparent substrate. Because the white is inkjet based, the preferred pigments are hollow or porous to avoid settling of heavy titania based white pigment. It further discloses an "inverse" type white ink application [0054 and 0057]; however, the white usage is based on total amount allowed by the substrate.

Although satisfactory, in U.S. Patent Publication 2009/0220695 A1, there is no adjustment of the white laydown with respect to the subsequent color inks, and two layers or more layers are required to create this opaque image. In U.S. Patent Publication 2011/0234660 A1, which is an inkjet process, there is no control of white ink based on color ink density; white is printed farthest from the viewing side, behind colors, not alongside. In U.S. Patent Publication 2013/0145383 A1, two printing stations are used, not one printing station, and the total white amount can exceed the total non-white amount ink. The present invention includes the advantages of adjusting the white laydown relative to color toner layers which reduces total toner cost, preserves the possible special visual effect provided by specialized substrates such as metallic/pearlescent substrate, and optimizes printable color gamut.

SUMMARY OF THE INVENTION

The present invention is directed to overcoming one or more of the problems set forth above. Briefly summarized, according to one aspect of the invention, the invention resides in an apparatus for printing on a receiver with a plurality of colored dry inks and a dry white ink, the apparatus comprising a look-up table having a set of one dimensional look-up tables for each of the colored inks and black inks, which look-up table which receives a value corresponding to a laydown at each pixel location of the receiver; wherein the look-up table determines a laydown of white ink at each pixel location depending on the laydown of the colored inks and black ink; a logic and control unit which determines an amount of white ink to laydown by computing a value from the determined white laydowns of each look-up table.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Before discussing the present invention, it is useful to understand the term "dry ink" as used herein. In this regard, dry ink refers to toner particles deposited on a substrate which are later fixed to the substrate by pressure, heat or both. In contrast, liquid ink refers to inkjet processes where liquid ink is deposited which then dries for forming an image on a substrate.

In the following description, some embodiments will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, embodiments described herein. Other aspects of such algorithms and systems, and hardware or software for producing and otherwise processing the image signals involved therewith, not specifically shown or described herein, are selected from such systems, algorithms, components, and elements known in the art. Given the system as described herein, software not specifically shown, suggested, or described herein that is useful for implementation of the invention is conventional and within the ordinary skill in such arts.

Figure 1:
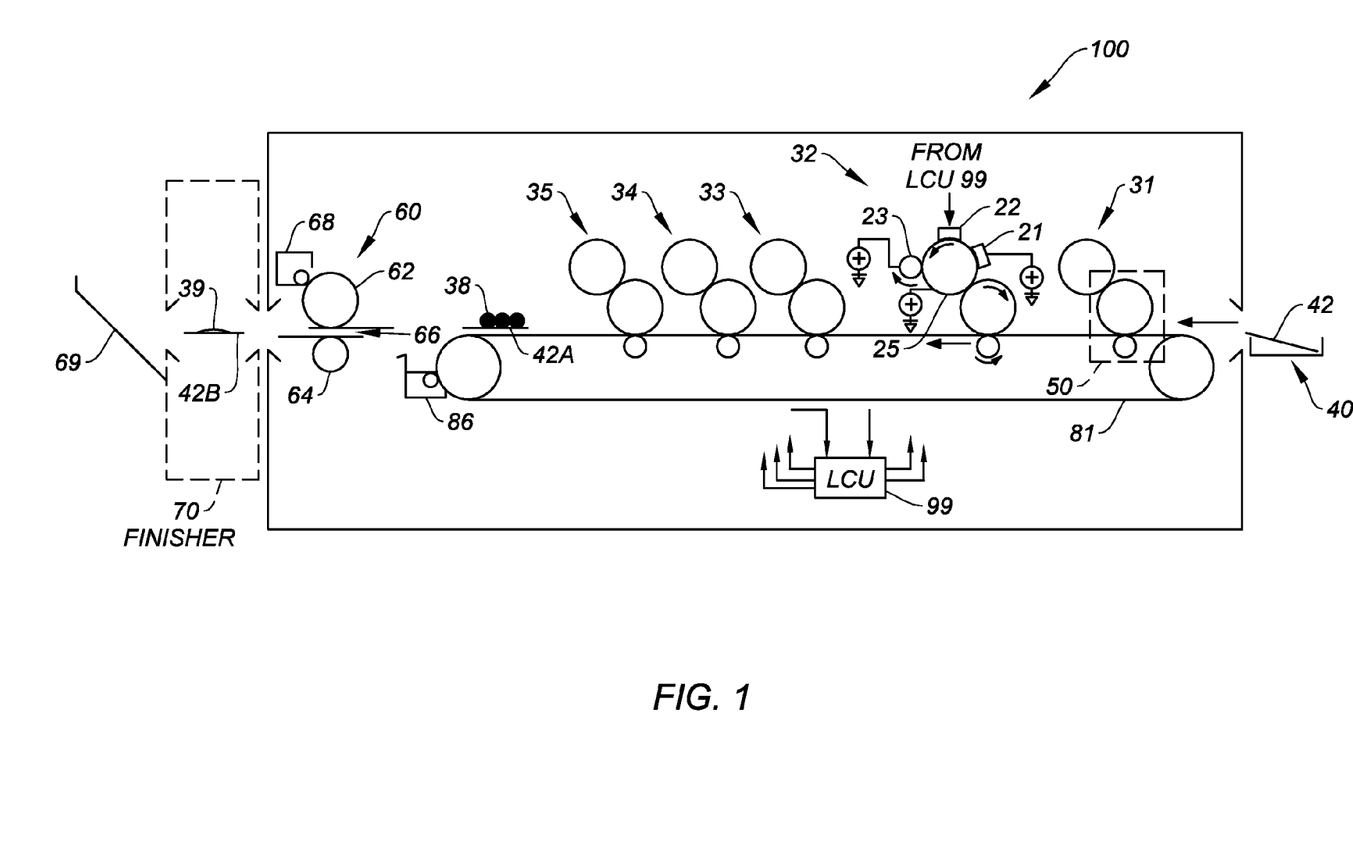
FIG. 1 is an electrophotographic printer useful for implementing the present invention.

FIG. 1 is an elevational cross-section illustrating portions of a typical electrophotographic printer 100 useful with various embodiments. Printer 100 is adapted to produce print images, such as single-color (monochrome), CMYK, CMYKF (five-color), or with the addition of a 6th development station (which is not shown) hexachrome images, on a receiver (multicolor images are also known as "multi-component" images). Images can include either or a combination of text, graphics, photos, and other types of visual content. One embodiment involves printing using an electrophotographic print engine having six sets of single-color image-producing or printing stations or modules arranged in tandem, but more or fewer than six colors can be combined to form a print image on a given receiver. Other electrophotographic writers or printer apparatus can also be included. Various components of the printer 100 are shown as rollers; other configurations are also possible, such as configurations having belts.

The printer 100 is an electrophotographic printing apparatus having a number of tandemly arranged electrophotographic image-forming printing modules 31, 32, 33, 34, 35, also known as electrophotographic imaging subsystems. Each printing module 31, 32, 33, 34, 35 produces a single-color toner image for transfer using a respective transfer subsystem 50 (for simplicity and clarity, only one is labeled) to a receiver 42 successively moved through the modules. The receiver 42 is transported from a supply unit 40, which can include active feeding subsystems as known in the art, into the printer 100. In various embodiments, the visible image can be transferred directly from an imaging roller to the receiver 42, or from an imaging roller to one or more transfer roller(s) or belt(s) in sequence in transfer subsystem 50, and then to the receiver 42. The receiver 42 is, for example, a selected section of a web of, or a cut sheet of, planar media such as paper or transparency film.

Each printing module 31, 32, 33, 34, 35 includes various components. For clarity, these are only shown in the printing module 32. Around photoreceptor 25 are arranged, ordered by the direction of rotation of photoreceptor 25, a charger 21, an exposure subsystem 22, and toning station 23.

In the EP process, an electrostatic latent image is formed on photoreceptor 25 by uniformly charging photoreceptor 25 and then discharging selected areas of the uniform charge to yield an electrostatic charge pattern corresponding to the desired image (a "latent image"). The charger 21 produces a uniform electrostatic charge on photoreceptor 25 or its surface. The exposure subsystem 22 selectively image-wise discharges photoreceptor 25 to produce a latent image. The exposure subsystem 22 can include a laser and raster optical scanner (ROS), one or more LEDs, or a linear LED array.

After the latent image is formed, charged toner particles are brought into the vicinity of the photoreceptor 25 by the toning station 23 and are attracted to the latent image to develop the latent image into a visible image. Note that the visible image may not be visible to the naked eye depending on the composition of the toner particles (for example clear toner). The toning station 23 can also be referred to as a development station. The toner can be applied to either the charged or discharged parts of the latent image. The toner particles can have a range of diameters, for example less than 8 micrometer, on the order of 10-15 micrometer, up to approximately 30 micrometer, or larger ("diameter" refers to the volume-weighted median diameter, as determined by a device such as a Coulter Multisizer).

After the latent image is developed into a visible image on photoreceptor 25, a suitable receiver 42 is brought into juxtaposition with the visible image. In the transfer subsystem 50, a suitable electric field is applied to transfer the toner particles of the visible image to the receiver 42 to form the desired print image 38 on the receiver 42, as shown on receiver 42A. The imaging process is typically repeated many times with reusable photoreceptors 25.

The receiver 42A is then removed from its operative association with photoreceptor 25 and subjected to heat or pressure to permanently fix ("fuse") print image 38 to receiver 42A. Plural print images are overlaid on one receiver before fusing to form a multi-color print image 38 on the receiver 42A.

Each receiver 42, during a single pass through the six printing modules 31, 32, 33, 34, 35, can have transferred in registration thereto up to five single-color toner images to form an image. In one embodiment, printing module 31 forms black (K) print images, 32 forms yellow (Y) print images, 33 forms magenta (M) print images, 34 forms cyan (C) print images and 35 forms white (W) print images. The receiver 42A is shown after passing through the printing module 36. The print image 38 on receiver 42A includes unfused toner particles.

Subsequent to transfer of the respective print images 38, overlaid in registration, one from each of the respective printing modules 31, 32, 33, 34, 35, the receiver 42A is advanced to a fuser 60, i.e. a fusing or fixing assembly, to fuse the print image 38 to receiver 42A. A transport web 81 transports the print-image-carrying receivers (e.g., 42A) to the fuser 60, which fixes the toner particles to the respective receivers 42A by the application of heat and pressure. The receivers 42A are serially de-tacked from transport web 81 to permit them to feed cleanly into fuser 60. The transport web 81 is then reconditioned for reuse at cleaning station 86 by cleaning and neutralizing the charges on the opposed surfaces of the transport web 81. A mechanical cleaning station (not shown) for scraping or vacuuming toner off the transport web 81 can also be used independently or with cleaning station 86. The mechanical cleaning station can be disposed along the transport web 81 before or after the cleaning station 86 in the direction of rotation of the transport web 81.

The fuser 60 includes a heated fusing roller 62 and an opposing pressure roller 64 that form a fusing nip 66 therebetween. In one embodiment, the fuser 60 also includes a release fluid application substation 68 that applies release fluid, e.g. silicone oil, to fusing roller 62. Alternatively, wax-containing toner can be used without applying release fluid to the fusing roller 62. Other embodiments of fusers, both contact and non-contact, can be employed. For example, solvent fixing uses solvents to soften the toner particles so they bond with the receiver 42. Photoflash fusing uses short bursts of high-frequency electromagnetic radiation (e.g. ultraviolet light) to melt the toner. Radiant fixing uses lower-frequency electromagnetic radiation (e.g. infrared light) to more slowly melt the toner. Microwave fixing uses electromagnetic radiation in the microwave range to heat the receivers (primarily), thereby causing the toner particles to melt by heat conduction, so that the toner is fixed to the receiver 42.

The receivers (e.g., receiver 42B) carrying the fused image (e.g., fused image 39) are transported in a series from the fuser 60 along a path either to a remote output tray 69, or for duplex printing, back to the printing modules 31, 32, 33, 34, 35 to create an image on the backside of the receiver (e.g., receiver 42B), i.e. to form a duplex print. Receivers (e.g., receiver 42B) can also be transported to any suitable output accessory. For example, an auxiliary fuser or glossing assembly can provide a clear-toner overcoat. Printer 100 can also include multiple fusers 60 to support applications such as overprinting, as known in the art.

In various embodiments, between the fuser 60 and the output tray 69, the receiver 42B passes through the finisher 70. Finisher 70 performs various media-handling operations, such as folding, stapling, saddle-stitching, collating, and binding.

The printer 100 includes the main printer apparatus logic and control unit (LCU) 99, which receives input signals from the various sensors associated with the printer 100 and sends control signals to the components of the printer 100. The LCU 99 can include a microprocessor incorporating suitable look-up tables and control software executable by the LCU 99. It can also include a field-programmable gate array (FPGA), programmable logic device (PLD), microcontroller, or other digital control system. The LCU 99 can include memory for storing control software and data. Sensors associated with the fusing assembly provide appropriate signals to the LCU 99. In response to the sensors, the LCU 99 issues command and control signals that adjust the heat or pressure within fusing nip 66 and other operating parameters of fuser 60 for receivers. This permits the printer 100 to print on receivers of various thicknesses and surface finishes, such as glossy or matte.

Image data for writing by the printer 100 can be processed by a raster image processor (RIP; not shown), which can include a color separation screen generator or generators. The output of the RIP can be stored in frame or line buffers for transmission of the color separation print data to each of the respective LED writers, e.g. for black (K), yellow (Y), magenta (M), cyan (C), and white (W), respectively. The RIP or color separation screen generator can be a part of printer 100 or remote therefrom. Image data processed by the RIP can be obtained from a color document scanner or a digital camera or produced by a computer or from a memory or network which typically includes image data representing a continuous image that needs to be reprocessed into halftone image data in order to be adequately represented by the printer. The RIP can perform image processing processes, e.g. color correction, in order to obtain the desired color print. Color image data is separated into the respective colors and converted by the RIP to halftone dot image data in the respective color using matrices, which comprise desired screen angles (measured counterclockwise from rightward, the +X direction) and screen rulings. The RIP can be a suitably-programmed computer or logic device and is adapted to employ stored or computed matrices and templates for processing separated color image data into rendered image data in the form of halftone information suitable for printing. These matrices can include a screen pattern memory (SPM).

Further details regarding printer 100 are provided in U.S. Pat. No. 6,608,641, issued on Aug. 19, 2003, to Peter S. Alexandrovich et al., and in U.S. Publication No. 20060133870, published on Jun. 22, 2006, by Yee S. Ng et al., the disclosures of which are incorporated herein by reference.

Figure 2:
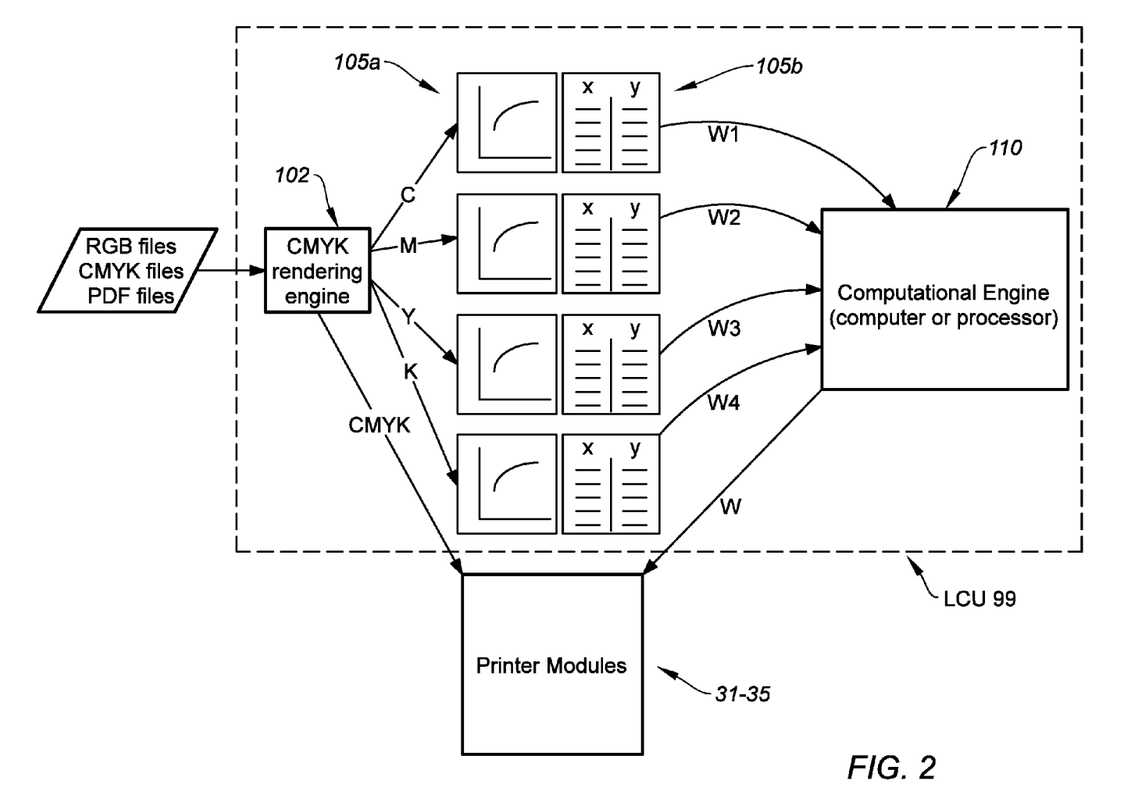
FIG. 2 is a block diagram illustrating details of the logic and control unit and its interaction with printing modules of the present invention.

Referring to FIG. 2, there is shown in block diagram details of the portion of the LCU 99 for rendering white toner based on the amount of colored toner being rendered. The LCU 99 receives images files, such as, but not limited to, RGB, CMYK, pdf, raster or vector files, that are sent to a CMYK rendering engine 102 which converts the particular image file into a standard CMYK format and then separates the CYMK format file into individual color components—Cyan component, Magenta component, Yellow component, and Black component. These individual color components are then each sent to either a one-dimensional transform 105$a$ or a one-dimensional look-up table (LUT) 105$b$. The transform 105$a$ or LUT 105$b$ takes the particular color component and obtains the corresponding white laydown at each pixel location. It is noted that the white color component varies according to the amount of the particular color component as illustrated schematically in FIG. 2. The LUT 105$b$ is in a table format in which corresponding values are stored; transform 105$a$ is a real-time look-up in which an algorithm determines the corresponding white laydown; and look-up table as used herein refers to either embodiment. The basic algorithm is to deposit maximal amount of white toner on the area of the media corresponding to the white point of the image, and gradually reducing monotonically the amount of white toner laydown relative to each increasing color toner laydown. The rate of white toner laydown reduction is dependent on the opacity of each color toner, the intended substrate's background color, and the toner laydown sequence. For example, the black toner has very high opacity. As a result, the white toner reduction rate relative to the black toner can be higher than other color toners such as yellow. Furthermore, the background color of the intended substrate will also affect the white toner reduction rate relative to each color toner laydown. For example, if the substrate is metallic, since the substrate surface is very reflective, the purpose of the white toner is simply to sufficiently block the underlying metallic texture structure without losing the metallic appearance. The white toner reduction rate will be much higher than that on a colored card board substrate. The four 1-D transforms or LUTs (105$a$ or 105$b$), one for each colorant, each output a value for the white laydown (W1, W2, W3, W4). Those values are input to a computational engine 110 that determines the print value for each pixel location based on the white laydown values from each transform or LUT (105a or 105b).

The determined value for W could be simply the smallest of the set of white values (W1, W2, W3, W4), or it could be an overage of the set of white values (W1, W2, W3, W4), or it could even be the largest of the set of white values (W1, W2, W3, W4). The value for the white ink laydown W and the original values for the colorants (CMYK) are provided to the printing module 31-35 for rendering and physical lay down and finishing of the colorants on the receiver.

Figure 3:
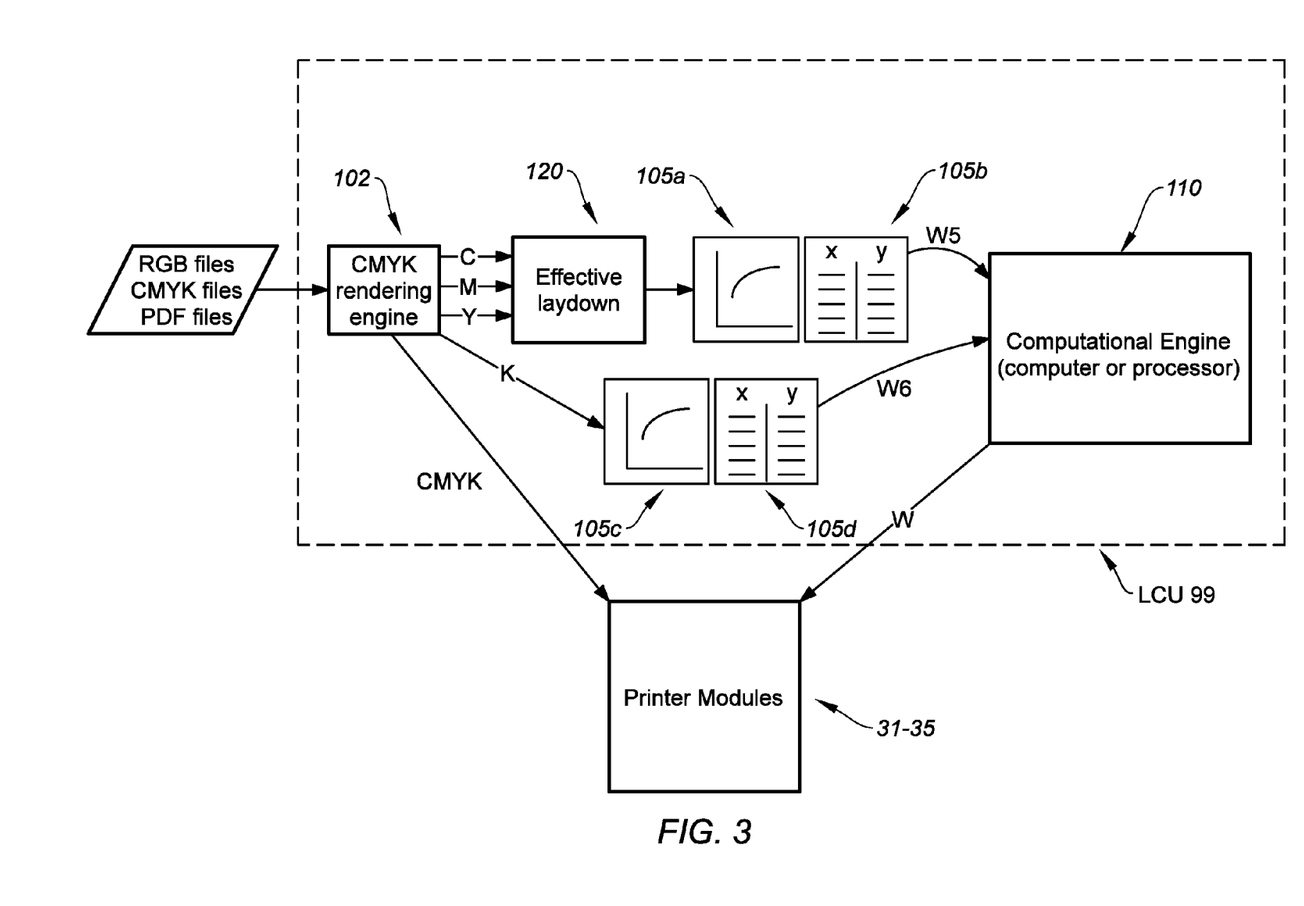
FIG. 3 is an alternative embodiment of the logic and control unit and its interaction with printing modules of the present invention.

Referring to FIG. 3, there is shown an alternative embodiment for rendering white toner based on the amount of colored toner being rendered. The LCU 99 receives images files, such as, but not limited to, RGB, CMYK, pdf, raster or vector files, that are sent to the CMYK rendering engine 102 which converts the received image file into a standard CMYK format and then separates the CYMK format file into individual color components—C component, M component, Y component, and K component. The CMY values are combined in an effective laydown engine 120 to determine an effective laydown of the colorants and then the effective laydown is sent to either the one dimensional transform 105a or the one dimensional LUT 105b, which is used to determine the desired laydown of white ink W5 at each pixel location (the y values) depending on the effective laydown of the colored inks (CMY) (the x values). The opaque black value K is provided to either a separate one dimensional transform 105c or one dimensional LUT 105d which correlates the laydown of the black ink (K) to another white laydown W6 based on the black ink. In other words, the two 1-D transforms or LUTs (either 105a or 105b and either 105c or 105d), one for the effective CMY and one for the black K laydown, each output a value for the white laydown (W5, W6). The W5 and W6 values are input to the computational engine 110 that determines the print value for each pixel location based on the white laydown values from each transform or LUT (either 105a or 105b and either 105c or 105d). To determine the effective laydown of the colored ink (CMY), first treat each distinct color toner as the same type of toner. Within a unit area, then compute the percent of averaged coverage of this new toner where the overlapped area of two of more color toner is counted only once. This averaged coverage can also change with respect to the halftone screen structure.

The determined value for W in this embodiment could be simply the smallest of the set of white values (W5, W6), or it could be an overage of the set of white values (W5, W6), or it could even be the largest of the set of white values (W5, W6). The value for the white ink laydown W and the original values for the colorants (CMYK) are provided to the print engine modules 31-35 for rendering and physical lay down and finishing of the colorants on the receiver.

Figure 4:
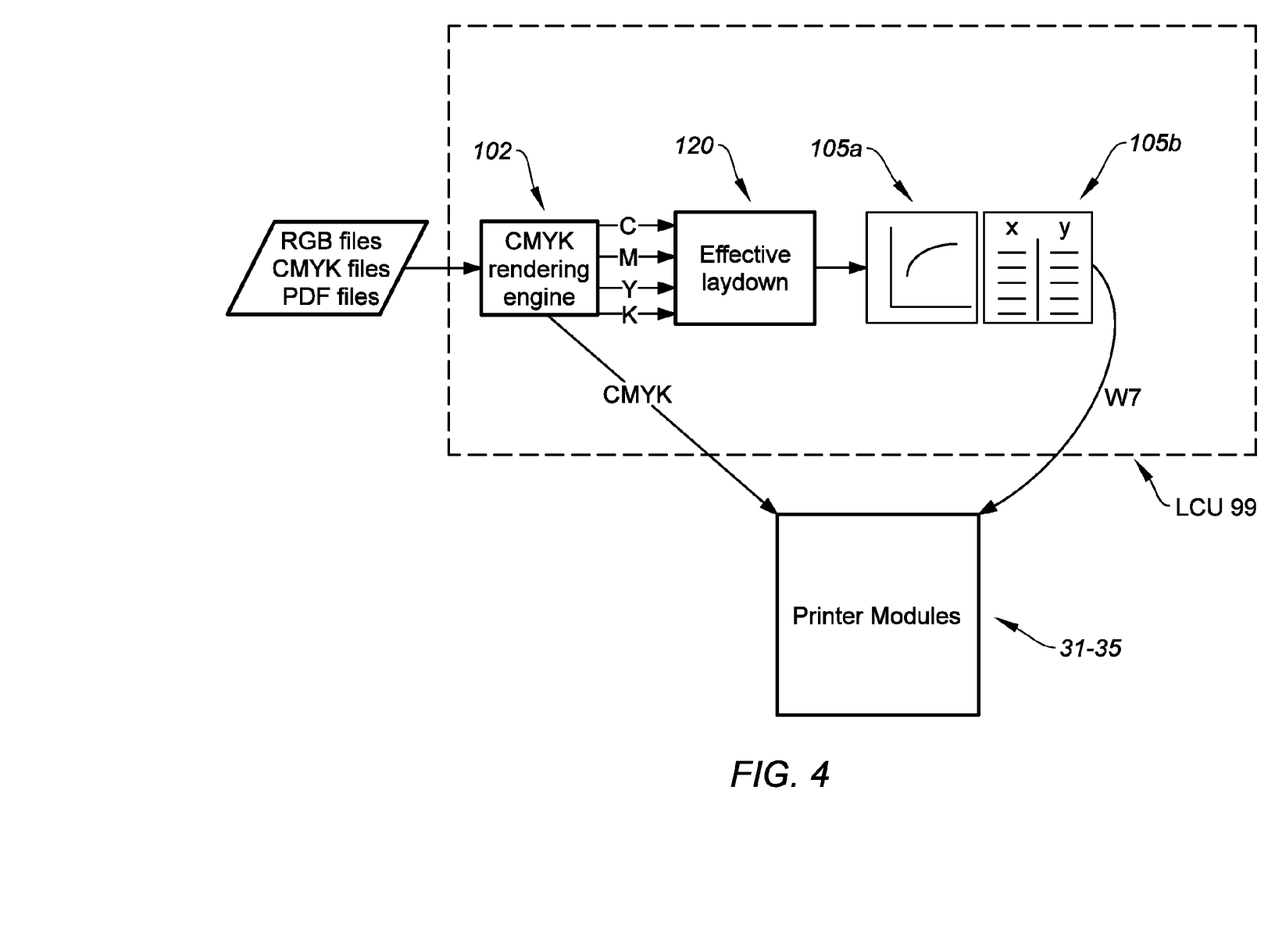
FIG. 4 is a third embodiment of the logic and control unit and its interaction with printing modules of the present invention.

Referring to FIG. 4, there is shown a third embodiment for rendering white toner based on the amount of colored toner being rendered. The LCU 99 receives images files, such as, but not limited to, RGB, CMYK, pdf, raster or vector files, that are sent to a CMYK rendering engine 102 which converts the received image file into a standard CMYK format and then separates the CYMK format file into individual color components—C component, M component, Y component, and K component. The CMYK values are combined in an effective laydown engine 120 to determine an effective laydown of the colorants and black and then the effective laydown is sent to either the one dimensional LUT 105a or 105b, which is used to determine the desired laydown of white ink W7 at each pixel location (the y values) depending on the effective laydown of the colored inks and black dry ink (CMYK). The 1-D transform or LUT (105a or 105b) outputs a value for the white laydown (W7). That value determines the white ink print value for each pixel location based on the effective laydown of CMYK. The value for the white ink laydown W7 and the original values for the colorants (CMYK) are provided to the printing module 31-35 for rendering and physical lay down and finishing of the colorants on the receiver.

Figure 5:
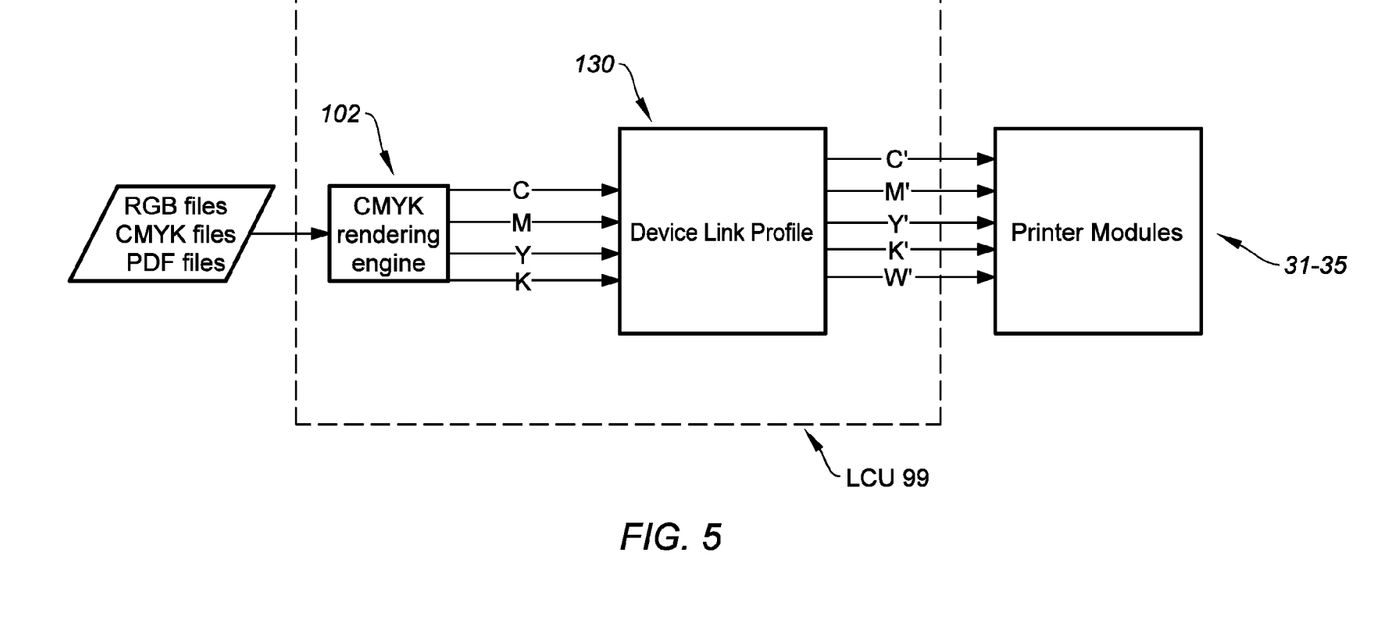
FIG. 5 is a fourth embodiment of the logic and control unit and its interaction with printing modules of the present invention.

Referring to FIG. 5, there is shown a fourth embodiment for rendering white toner based on the amount of colored toner being rendered. The LCU 99 receives images files, such as, but not limited to, RGB, CMYK, pdf, raster or vector files, that are sent to a CMYK rendering engine 102 which converts the received image file into a standard CMYK format and then separates the CYMK format file into individual color components—C component, M component, Y component, and K component. The CMYK values are then combined using a color profile known as the Device Link Profile 130 to determine the desired laydown of all the dry inks, C'M'Y'K' and W'. The effective laydowns are provided to the printing modules 31-35 for rendering and physical lay down and finishing of the colorants on the receiver. The advantage of utilizing a Device link profile to provide proper white toner laydown relative to the color toner laydown, such as C,M,Y, K, and possibly other supplemental accent color toners, from the digital controller is its capability to specify different amount of white toner laydown at different color toner laydown composition on the intended printing substrate. A printer output device link profile is composed of a multidimensional LUT from N-color input channels to M-Color output channels. In the case of creating a separate white toner layer, the dimension of the input/output color channels is N and N+1 respectively. In one embodiment, each color toner is assigned with its own opacity coefficient ranging from 0 to 1, where 0 means complete transparent and 1 means complete opaque. For example, the opacity coefficient for yellow toner is usually set as the lowest among all color toners and the black toner is usually set to be 1. Based on a chosen halftone screen set for every color channel, the effective substrate-blocking ratio, Br, on a unit area by all color toner laydown combined in the multidimensional LUT of the Device link profile can be computed. The white toner laydown, W', is inversely correlated with the computed substrate-blocking ratio, for example, W=1−Br. This correlation function will also be dependent on the selected substrate. At the same time, C'M'Y'K' are computed taking into account grey component removal and the type of substrate used.

Grey component removal is used by the Device link profile to substitute a quantity of black ink for the grey component of the CMY inks. The Device link profile uses properties of the receiver to determine the multidimensional look-up table transforms, and properties of the receiver include the color of the receiver, type of the receiver or reflectance of the receiver. The Device link profile also depends on order of laydown of the colored, black and white toner on the receiver.

The present invention has been described in detail with particular reference to certain preferred embodiments thereof, but it will be understood that variations and modifications can be effected within the spirit and scope of the invention.

Parts List
21 charger
22 exposure subsystem
23 toning station
25 photoreceptor
31 printing module
32 printing module
33 printing module 34 printing module
35 printing module
38 print image
39 fused image
40 supply unit
42 receiver
42A receiver
42B receiver
50 transfer subsystem
60 fuser
62 fusing roller
64 pressure roller
66 fusing nip
68 release fluid application substation
69 output tray
70 finisher
81 transport web
86 cleaning station
99 logic and control unit (LCU)
100 printer
102 CMYK rendering engine
105a transform
105b one-dimensional look-up table (LUT)
105c transform
105d one dimensional look-up table (LUT)
110 computational engine
120 effective laydown engine
130 Device link profile

The invention claimed is:

1. An apparatus for printing on a receiver with a plurality of colored dry inks and a dry white ink, the apparatus comprising:
- a logic and control unit which determines a laydown amount of color inks and black ink at each pixel by computing an input value at each pixel location from an input file; and
- a look-up table having a set of one dimensional look-up tables for each of the colored inks and black ink, wherein the look-up table receives a colorant value corresponding to a laydown of the color inks and the black ink at each corresponding pixel location of the receiver; wherein the look-up table determines a laydown of white ink at each pixel location depending on the laydown of the colored inks and black ink;
- the logic and control unit which further determines an amount of white ink to laydown by computing a white value from the determined white laydowns of each look-up table.

2. The apparatus as in claim 1, wherein the logic and control unit chooses the lowest white laydown from each look-up table.

3. The apparatus as in claim 1, wherein the logic and control unit chooses an average of the white laydown from each of the look-up tables.

4. The apparatus as in claim 1, wherein the look-up table chooses a maximum white laydown form each of the look-up tables.

5. The apparatus as in claim 1, wherein the logic and control unit determines an effective colored ink coverage from the colored inks, and an amount of the white laydown is determined from the effective colored ink coverage.

6. The apparatus as in claim 5, wherein the logic and control unit chooses the lowest white laydown from the effective colored ink coverage and white laydown from the black look-up table.

7. The apparatus as in claim 1, wherein the look-up table white value depends on characteristics of the receiver.

8. The apparatus as in claim 7, wherein the characteristics include the color of the receiver, type of the receiver or reflectance of the receiver.

9. The apparatus as in claim 1, wherein the logic and control unit determines an effective ink coverage from the colored inks and black ink, and an amount of the white laydown is determined from the effective colored ink coverage.

10. The apparatus as in claim 1, wherein the look-up table white value depends on an order of laydown of the colored, black and white toner on the receiver.

\* \* \* \* \*